(12) United States Patent
Ueno et al.

(10) Patent No.: US 9,246,161 B2
(45) Date of Patent: Jan. 26, 2016

(54) ALL-SOLID BATTERY

(75) Inventors: Yukiyoshi Ueno, Gotenba (JP); Noriaki Nishino, Suntou-gun (JP); Yasushi Tsuchida, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1086 days.

(21) Appl. No.: 13/288,444

(22) Filed: Nov. 3, 2011

(65) Prior Publication Data

US 2012/0115028 A1    May 10, 2012

(30) Foreign Application Priority Data

Nov. 8, 2010  (JP) ................................. 2010-249816

(51) Int. Cl.
| | |
|---|---|
| H01M 4/02 | (2006.01) |
| H01M 4/13 | (2010.01) |
| H01M 10/0525 | (2010.01) |
| H01M 10/0562 | (2010.01) |
| H01M 10/0585 | (2010.01) |
| H01M 6/18 | (2006.01) |

(52) U.S. Cl.
CPC ............ *H01M 4/13* (2013.01); *H01M 10/0525* (2013.01); *H01M 10/0562* (2013.01); *H01M 10/0585* (2013.01); *H01M 6/18* (2013.01); *Y02E 60/122* (2013.01)

(58) Field of Classification Search
CPC .............. H01M 4/13; H01M 10/0525; H01M 10/0585; H01M 10/0562; H01M 6/18; Y02E 60/122
USPC ......................................................... 429/209
See application file for complete search history.

(56) References Cited

U.S. PATENT DOCUMENTS

| | | | |
|---|---|---|---|
| 2005/0132562 A1* | 6/2005 | Saito et al. ................... | 29/623.5 |
| 2006/0251965 A1* | 11/2006 | Nagayama et al. ........... | 429/209 |
| 2010/0099029 A1* | 4/2010 | Kinoshita et al. ............ | 429/316 |
| 2012/0052382 A1* | 3/2012 | Yoshida et al. ............... | 429/211 |

FOREIGN PATENT DOCUMENTS

| | | | |
|---|---|---|---|
| JP | A-11-283664 | | 10/1999 |
| JP | A-2006-210003 | | 8/2006 |
| JP | B2-4055671 | | 3/2008 |
| JP | A-2009-146657 | | 7/2009 |
| JP | A-2009-289586 | | 12/2009 |
| JP | A-2010-027530 | | 2/2010 |
| JP | A-2010-118298 | | 5/2010 |
| JP | 2010245024 A | * | 10/2010 |
| JP | A-2010-245024 | | 10/2010 |
| WO | WO 2010/106412 A1 | | 9/2010 |

* cited by examiner

*Primary Examiner* — Gary Harris
(74) *Attorney, Agent, or Firm* — Oliff PLC

(57) ABSTRACT

An all-solid battery is formed so that an electrode active material layer of at least one of positive and negative electrodes has a composition distribution such that a local volume ratio, expressed by a ratio of a volume of an electrode active material contained in a part of the electrode active material layer with respect to a volume of a solid electrolyte material contained in the part of the electrode active material layer, increases as the part of the electrode active material layer approaches from an interface of the solid electrolyte layer toward an interface of a current collector in a thickness direction of the electrode active material layer, and a voidage of the electrode active material layer increases as the part of the electrode active material layer approaches from the interface of the solid electrolyte layer toward the interface of the current collector in the thickness direction.

17 Claims, 3 Drawing Sheets

ALL-SOLID BATTERY

INCORPORATION BY REFERENCE

The disclosure of Japanese Patent Application No. 2010-249816 filed on Nov. 8, 2010 including the specification, drawings and abstract is incorporated herein by reference in its entirety.

BACKGROUND OF THE INVENTION

1. Field of the Invention

The invention relates to an all-solid battery that has a reduced diffusion resistance and an improved rate characteristic.

2. Description of Related Art

With a rapid proliferation of information-related equipment and communication equipment, such as personal computers, camcorders and cellular phones, in recent years, it becomes important to develop a battery used as a power supply of the information-related equipment or the communication equipment. In addition, in automobile industry, or the like, development of a high-power and high-capacity battery for electric vehicles or hybrid vehicles has been proceeding. Currently, among various types of battery, a lithium battery becomes a focus of attention in terms of high energy density.

Currently commercially available lithium batteries employ an electrolytic solution that contains a flammable organic solvent. Therefore, it is necessary to install a safety device that suppresses an increase in temperature in the event of a short circuit, or improve a structure or a material for short-circuit prevention. In contrast to this, all-solid lithium batteries that replace an electrolytic solution with a solid electrolyte layer do not use a flammable organic solvent in the batteries. For this reason, it is considered that the safety devices for the all-solid batteries are simplified and the all-solid lithium batteries are excellent in manufacturing cost and productivity.

In an electrode of such an all-solid lithium battery, normally, a solid electrolyte material is mixed and used in order to improve the conductivity of lithium ions. For example, Japanese Patent Application Publication No. 2009-146657 (JP-A-2009-146657) describes a solid electrolyte lithium secondary battery in which a positive electrode, a solid electrolyte layer (SE) and a negative electrode current collector are sequentially laminated on each surface of a plate-like positive electrode current collector. In the positive electrode, a positive electrode mixture layer that contains positive electrode active material powder and solid electrolyte powder is formed. This is because a layer configuration is formed so that a solid electrolyte having a high adhesion with a positive electrode or negative electrode is interposed to thereby reduce warpage, deformation and crack of the battery due to expansion and contraction of the positive electrode and negative electrode resulting from charging and discharging.

In addition, all-solid lithium batteries are, for example, required to have a further high capacity and high power as an in-vehicle battery, and a method for the batteries to have a high capacity is to increase the thickness of an electrode active material layer. However, there is a problem that this method leads to an increase in resistance resulting from the increased thickness of the electrode active material layer and, therefore, the output characteristic deteriorates. As measures against the above, for example, Japanese Patent Application Publication No. 2006-210003 (JP-A-2006-210003) describes a battery electrode that includes a current collector and an active material layer. The active material layer contains an active material and is formed on the surface of the current collector. In the battery electrode, the specific surface of the active material increases from the surface of the active material layer toward the current collector. This is intended to improve the durability of a battery in such a manner that the specific surface of the active material is increased from the surface of the active material layer toward the current collector of the active material layer to reduce nonuniform reaction in the thickness direction of the active material layer even during charging and discharging under a high power condition. In addition, Japanese Patent No. 4055671 describes an electrode for a non-aqueous electrolyte battery. In an electrode active material layer that contains an all-solid polymer electrolyte or a polymer gel electrolyte as an electrolyte and that is formed on a current collector, the electrode has a concentration gradient such that the concentration of a solid content other than the electrolyte increases from the surface of the electrode active material layer toward the current collector. Japanese Patent Application Publication No. 2010-27530 (JP-A-2010-27530) describes a battery electrode that includes a current collector and an active material layer formed on the surface of the current collector. In the battery electrode, the concentration of an active material contained in the active material layer increases from the current collector toward the surface of the active material layer.

All-solid batteries are required for further reduced diffusion resistance and further improved rate characteristic.

SUMMARY OF THE INVENTION

The invention provides an all-solid battery having a reduced diffusion resistance and an improved rate characteristic.

An aspect of the invention provides an all-solid battery. The all-solid battery includes: a positive electrode that includes a positive electrode current collector and a positive electrode active material layer, wherein the positive electrode active material layer is formed on the positive electrode current collector and contains a positive electrode active material and a solid electrolyte material; a negative electrode that includes a negative electrode current collector and a negative electrode active material layer, wherein the negative electrode active material layer is formed on the negative electrode current collector and contains a negative electrode active material and the solid electrolyte material; and a solid electrolyte layer that is formed between the positive electrode and the negative electrode, wherein the electrode active material layer of at least one of the positive electrode and the negative electrode has a composition distribution such that a local volume ratio, which is expressed by a ratio of a volume of the electrode active material contained in a part of the electrode active material layer with respect to a volume of the solid electrolyte material contained in the part of the electrode active material layer, increases as the part of the electrode active material layer approaches from an interface of the solid electrolyte layer toward an interface of the current collector in a thickness direction of the electrode active material layer, and a voidage of the electrode active material layer increases as the part of the electrode active material layer approaches from the interface of the solid electrolyte layer toward the interface of the current collector in the thickness direction of the electrode active material layer.

According to the aspect of the invention, the electrode active material layer has the local volume ratio that increases as the part of the electrode active material layer approaches from the interface of the solid electrolyte layer toward the interface of the current collector in the thickness direction of the electrode active material layer. By so doing, the electrode active material is increased at a side adjacent to the current collector to make it possible to easily form an electron conducting path, and the solid electrolyte material is increased at a side adjacent to the solid electrolyte layer to make it possible to form a thick lithium ion conducting path. By so doing, it is possible to obtain an all-solid battery that is able to increase the magnitude of current and that has a reduced diffusion resistance and an improved rate characteristic. In addition, the voidage of the electrode active material layer is increased as the part of the electrode active material layer approaches from the interface of the solid electrolyte layer toward the interface of the current collector in the thickness direction of the electrode active material layer. By so doing, expansion or contraction of the electrode active material, which is remarkable at a side adjacent to the current collector having a large amount of the electrode active material, may be absorbed by voids, so it is possible to improve the durability of the all-solid battery.

In the above aspect, the at least one of the positive electrode and the negative electrode may be the positive electrode, and the electrode active material layer may be the positive electrode active material layer.

In the above aspect, the solid electrolyte material may be a sulfide-based solid electrolyte material. The sulfide-based solid electrolyte material is soft, so the sulfide-based solid electrolyte material is easily deformed to easily form an ion conducting path.

In the above aspect, the solid electrolyte material may have a particulate shape. This is because, in the electrode active material layer, voids may be formed between the solid electrolyte material particles and mechanical displacement at the time of expansion or contraction of the electrode active material may be absorbed by the voids.

According to the aspect of the invention, it is advantageously possible to provide an all-solid battery that has a reduced diffusion resistance and an improved rate characteristic.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
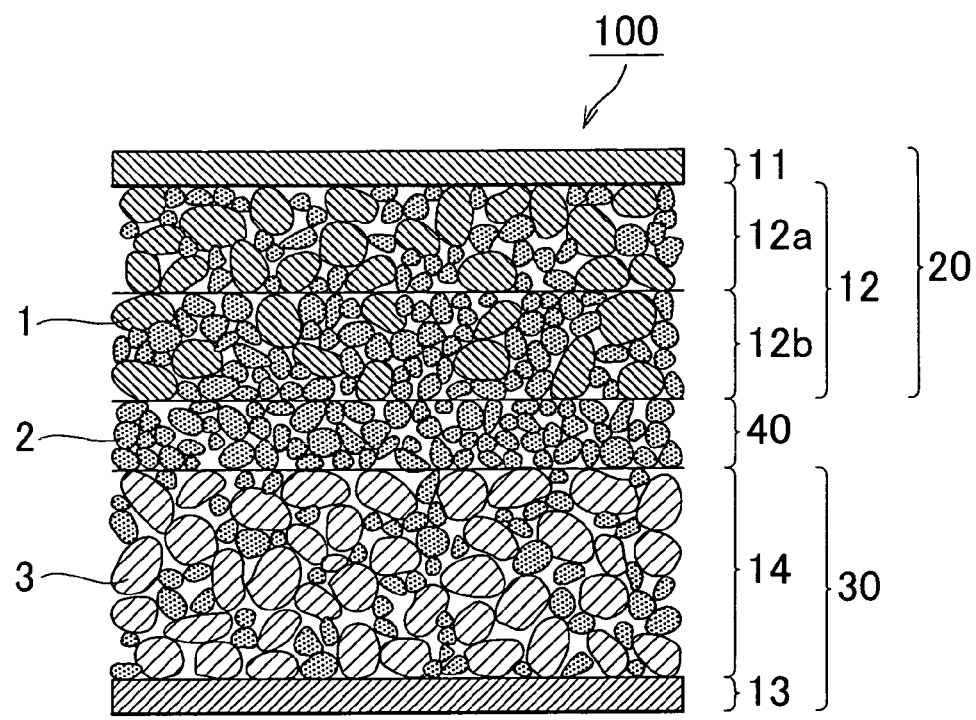
FIG. 1 is a schematic cross-sectional view that shows an example of an all-solid battery according to an embodiment of the invention.

Hereinafter, an all-solid battery according to an embodiment of the invention will be described in detail.

The all-solid battery according to the embodiment of the invention includes: a positive electrode that includes a positive electrode current collector and a positive electrode active material layer, wherein the positive electrode active material layer is formed on the positive electrode current collector and contains a positive electrode active material and a solid electrolyte material; a negative electrode that includes a negative electrode current collector and a negative electrode active material layer, wherein the negative electrode active material layer is formed on the negative electrode current collector and contains a negative electrode active material and the solid electrolyte material; and a solid electrolyte layer that is formed between the positive electrode and the negative electrode, wherein the electrode active material layer of at least one of the positive electrode and the negative electrode has a composition distribution such that a local volume ratio, which is expressed by the ratio ($V_a$(partial)/$V_e$(partial)) of the volume ($V_a$(partial)) of the electrode active material contained in a part of the electrode active material layer with respect to the volume ($V_e$(partial)) of the solid electrolyte material contained in the part of the electrode active material layer, increases as the part of the electrode active material layer approaches from the interface of the solid electrolyte layer toward the interface of the current collector in the thickness direction of the electrode active material layer, and the voidage of the electrode active material layer increases as the part of the electrode active material layer approaches from the interface of the solid electrolyte layer toward the interface of the current collector in the thickness direction of the electrode active material layer.

In the embodiment of the invention, the "composition distribution such that the local volume ratio increases as the part of the electrode active material layer approaches from the interface of the solid electrolyte layer toward the interface of the current collector in the thickness direction of the electrode active material layer" means a composition distribution such that the local volume ratio increases from the interface of the solid electrolyte layer toward the interface of the current collector and, more specifically, means a composition distribution such that, when the local volume ratios of different two parts in the electrode active material layer are compared with each other, the local volume ratio of the part closer to the current collector is larger than the local volume ratio of the part closer to the solid electrolyte layer. The increase in the local volume ratio in this case includes both a continuous increase, such as a curved increase and a linear increase, and an intermittent increase, such as a stepwise increase. In addition, the "voidage of the electrode active material layer increases as the part of the electrode active material layer approaches from the interface of the solid electrolyte layer toward the interface of the current collector in the thickness direction of the electrode active material layer" means that the voidage of the electrode active material layer increases from the interface of the solid electrolyte layer toward the interface of the current collector and, more specifically, means that, when the voidages of different two parts in the electrode active material layer are compared with each other, the voidage of the part closer to the current collector is larger than the voidage of the part closer to the solid electrolyte layer. The increase in the voidage in this case includes both a continuous increase, such as a curved increase and a linear increase, and an intermittent increase, such as a stepwise increase.

FIG. 1 is a schematic cross-sectional view that shows an example of the all-solid battery according to the embodiment of the invention. The all-solid battery 100 shown in FIG. 1 includes a positive electrode 20, a negative electrode 30 and a solid electrolyte layer 40. The positive electrode 20 includes a positive electrode current collector 11 and a positive electrode active material layer 12. The positive electrode active material layer 12 is formed on the positive electrode current collector 11 and contains a positive electrode active material 1 and a solid electrolyte material 2. The negative electrode 30 includes a negative electrode current collector 13 and a negative electrode active material layer 14. The negative electrode active material layer 14 is formed on the negative electrode current collector 13 and contains a negative electrode active material 3 and the solid electrolyte material 2. The solid electrolyte layer 40 is formed between the positive electrode 20 and the negative electrode 30 and is formed of the solid electrolyte material 2. In addition, the positive electrode active material layer 12 is formed of a first positive electrode active material layer 12a and a second positive electrode active material layer 12b. Within the positive electrode active material layer 12, the first positive electrode active material layer 12a is arranged closer to the positive electrode current collector 11, and the second positive electrode active material layer 12b is arranged closer to the solid electrolyte layer 40. The first positive electrode active material layer 12a and the second positive electrode active material layer 12b each contain the positive electrode active material 1 and the solid electrolyte material 2. Where the local volume ratio ($V_a$(partial)/$V_e$(partial)) of the first positive electrode active material layer 12a is a1, the voidage of the first positive electrode active material layer 12a is b1, the local volume ratio of the second positive electrode active material layer 12b is a2 and the voidage of the second positive electrode active material layer 12b is b2, a1 is higher than a2 and b1 is higher than b2. That is, the local volume ratio that is expressed by the volume ratio of the positive electrode active material 1 in the first positive electrode active material layer 12a is set so as to be higher than the local volume ratio that is expressed by the volume ratio of the positive electrode active material 1 in the second positive electrode active material layer 12b, and the voidage in the first positive electrode active material layer 12a is set so as to be higher than the voidage in the second positive electrode active material layer 12b.

According to the embodiment of the invention, the electrode active material layer has the local volume ratio ($V_a$(partial)/$V_e$(partial)) that increases as the part of the electrode active material layer approaches from the interface of the solid electrolyte layer toward the interface of the current collector in the thickness direction of the electrode active material layer. By so doing, the electrode active material is at a side adjacent to the current collector to make it possible to easily form an electron conducting path, and the solid electrolyte material is increased at a side adjacent to the solid electrolyte layer to make it possible to form a thick lithium ion conducting path. By so doing, it is possible to obtain an all-solid battery that is able to increase the magnitude of current and that has a reduced diffusion resistance and an improved rate characteristic. In addition, the voidage of the electrode active material layer is increased as the part of the electrode active material layer approaches from the interface of the solid electrolyte layer toward the interface of the current collector in the thickness direction of the electrode active material layer. By so doing, expansion or contraction of the electrode active material, which is remarkable at a side adjacent to the current collector having a large amount of the electrode active material, may be absorbed by voids, so it is possible to improve the durability of the all-solid battery. In the existing art, it has been considered that increasing the voidage of the electrode active material layer adjacent to the current collector leads to an increase in diffusion resistance. In contrast to this, in the embodiment of the invention, the voidage and local volume ratio ($V_a$(partial)/$V_e$(partial)) of the electrode active material layer adjacent to the current collector are increased to suppress an increase in diffusion resistance, while making it possible to improve the durability.

Figure 2:
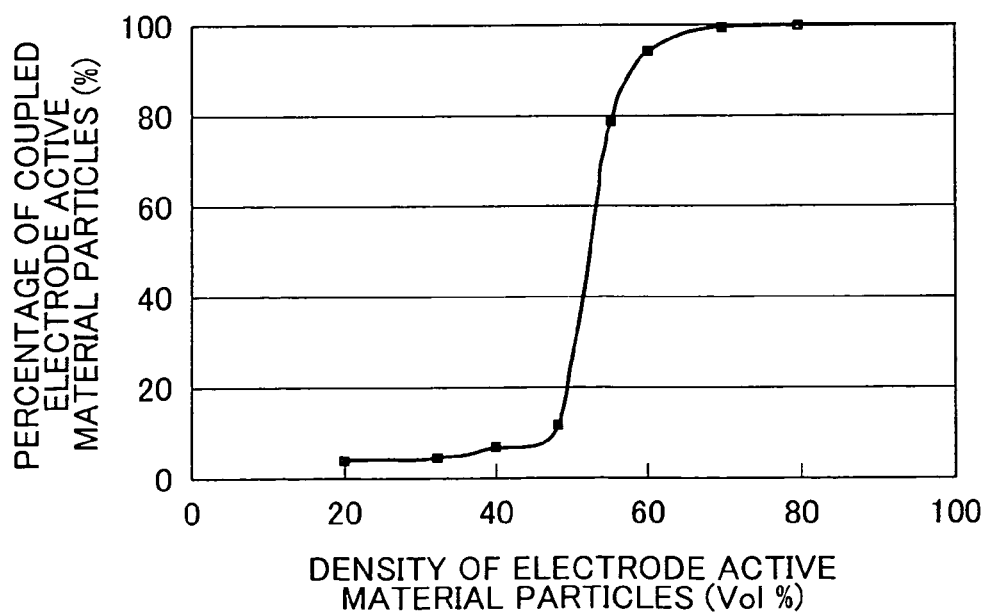
FIG. 2 is a graph that shows the correlation between the density of electrode active material particles and the percentage of coupled electrode active material particles, obtained through simulation of percolation theory.

In the embodiment of the invention, it is presumable that, when the electrode active material adjacent to the current collector is increased, electrode active material particles are easily coupled to one another to easily form an electron conducting path. This may be described on the basis of, for example, the percolation theory. FIG. 2 is a graph that shows the correlation between the density of electrode active material particles and the percentage of coupled electrode active material particles, obtained through simulation of the percolation theory. In FIG. 2, the ordinate axis represents the percentage (%) of coupled electrode active material particles, and the abscissa axis represents the density (Vol %) of electrode active material particles. Here, the "percentage of coupled electrode active material particles" means the percentage of electrode active material particles that are continuously coupled to a predetermined distance in the electrode active material layer from the current collector, and the "density of electrode active material particles" means the percentage of electrode active material particles in the electrode active material layer. As is apparent from FIG. 2, the density of electrode active material particles positively correlates with the percentage of coupled electrode active material particles, and, particularly, when the density of electrode active material particles is around 50 Vol %, the percentage of coupled electrode active material particles steeply increases. Note that this also applies to the solid electrolyte material.

Figure 3:
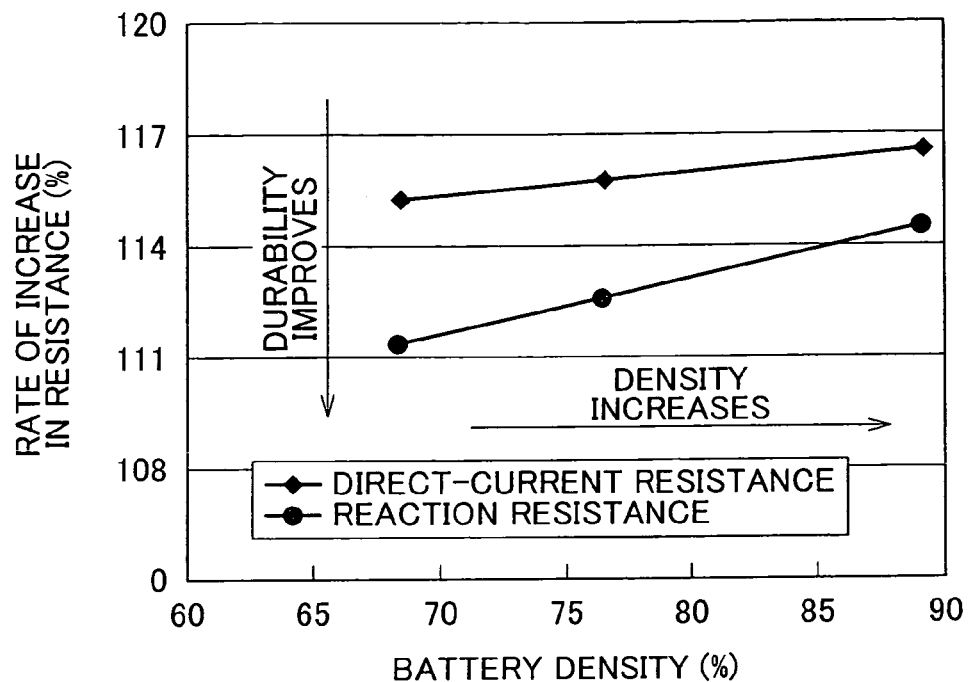
FIG. 3 is a graph that shows the correlation between a battery density and the durability of a battery.

FIG. 3 is a graph that shows the correlation between a battery density and the durability of the battery. In FIG. 3, the ordinate axis represents the rate of increase in resistance (%), and the abscissa axis represents a battery density (%). Here, the "rate of increase in resistance" means the percentages of direct-current resistance and reaction resistance when the battery is repeatedly charged and discharged a predetermined number of times with respect to the initial direct-current resistance and initial reaction resistance of the battery, and the "battery density" means the percentage of the non-void portion (portion that a battery component, such as an electrode, occupies) of the battery. As shown in FIG. 3, a battery density negatively correlates with the durability of the battery, and, as the battery density decreases, the rate of increase in direct-current resistance and the rate of increase in reaction resistance decrease, and the durability of the battery improves. This is presumably because, as the battery density decreases, the void portion of the battery increases, and expansion or contraction of the electrode active material may be further absorbed. In the embodiment of the invention, in consideration of the voidage of the electrode active material layer, expansion and contraction of the electrode active material resulting from charging and discharging are relieved to ensure the durability of the all-solid battery. Hereinafter, the all-solid battery according to the embodiment of the invention will be described component by component.

First, the positive electrode in the embodiment of the invention will be described. The positive electrode in the embodiment of the invention includes the positive electrode current collector and the positive electrode active material layer. The positive electrode active material layer is formed on the positive electrode current collector and contains the positive electrode active material and the solid electrolyte material.

The positive electrode active material layer in the embodiment of the invention at least contains the positive electrode active material and the solid electrolyte material, and may further contain at least one of a conducting material and a binding agent where necessary.

The positive electrode active material used in the embodiment of the invention may be, for example, a lithium transition metal oxide, such as $LiCo_xMn_yO_2$, $LiNi_xCo_yO_2$, $LiNi_xMn_yO_2$, $LiNi_xCo_yMn_zO_2$, lithium cobaltate ($LiCoO_2$), lithium niccolate ($LiNiO_2$), lithium manganate ($LiMnO_2$), iron olivine ($LiFePO_4$), cobalt olivine ($LiCoPO_4$), manganese olivine ($LiMnPO_4$) and lithium titanate ($Li_4Ti_5O_{12}$), a chalcogen compound, such as copper chevrel ($Cu_2Mo_6S_8$), iron sulfide (FeS), cobalt sulfide (CoS) and nickel sulfide (Ni), or the like.

The shape of the positive electrode active material may be, for example, a particulate shape. Among others, the shape of the positive electrode active material is desirably a rectangular parallelepiped shape or an ellipsoidal shape. In addition, when the positive electrode active material has a particulate shape, the mean particle diameter, for example, desirably ranges from 1 μm to 50 μm, more desirably ranges from 1 μm to 20 μm and further desirably ranges from 3 μm to 5 μm. This is because handleability may deteriorate when the mean particle diameter of the positive electrode active material is too small and it may be difficult to obtain a flat positive electrode active material layer when the mean particle diameter of the positive electrode active material is too large. Note that the mean particle diameter of the positive electrode active material may be, for example, obtained in such a manner that the particle diameters of active material carriers observed by a scanning electron microscope (SEM) are measured and averaged.

The solid electrolyte material used in the embodiment of the invention is not specifically limited as long as it has an ion conduction property and an electrical insulation property. The solid electrolyte material may be, for example, a sulfide-based solid electrolyte material, an oxide-based solid electrolyte material, or the like. In the embodiment of the invention, among others, the sulfide-based solid electrolyte material is desirable. The sulfide-based solid electrolyte material is soft, so the sulfide-based solid electrolyte material is easily deformed to easily form an ion conducting path.

The sulfide-based solid electrolyte material used in the embodiment of the invention is not specifically limited as long as it contains sulfur (S) and it has an ion conduction property and an electrical insulation property. Here, when the all-solid battery according to the embodiment of the invention is an all-solid lithium battery, the sulfide-based solid electrolyte material used may be specifically $Li_2S$—$P_2S_5$ ($Li_2S$:$P_2S_5$=50:50 to 100:0), $Li_2S$—$P_2S_5$—LiI, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$LiI, $Li_2S$—$SiS_2$—$P_2S_5$LiI, $Li_2S$—$B_2S_3$, $Li_2S$—$P_2S_5$—$Z_mS_n$(Z=Ge, Zn, Ga), $Li_2S$—$GeS_2$, $Li_2S$—$SiS_2$—$Li_3PO_4$, $Li_2S$—$SiS_2$—$Li_x$-$MO_y$(M=P, Si, Ge, B, Al, Ga, In), or the like. Note that, when the all-solid battery according to the embodiment of the invention is an all-solid lithium battery, the oxide-based solid electrolyte material used in the embodiment of the invention may be, for example, LiPON (lithium phosphate oxynitride), $Li_{1.3}Al_{0.3}Ti_{0.7}(PO_4)_3$, $La_{0.51}Li_{0.34}TiO_{0.74}$, $Li_3PO_4$, $Li_2SiO_2$, $Li_2SiO_4$, or the like.

In the embodiment of the invention, the solid electrolyte material desirably has a particulate shape. This is because, in the positive electrode active material layer, voids may be formed between the solid electrolyte material particles and mechanical displacement at the time of expansion or contraction of the positive electrode active material may be absorbed by the voids.

The positive electrode active material layer in the embodiment of the invention may further contain a conducting material. The conducting material is not specifically limited as long as the conducting material is able to improve the conductivity of the positive electrode active material layer. For example, the conducting material may be acetylene black, Ketjen black, carbon fiber, or the like. When the positive electrode active material layer contains a conducting material, the volume of the conducting material contained in a part closer to the current collector is desirably larger than the volume of the conducting material contained in a part closer to the solid electrolyte layer. The increase in the volume of the conducting material in this case includes both a continuous increase, such as a curved increase and a linear increase, and an intermittent increase, such as a stepwise increase. In addition, the content of the conducting material in the positive electrode active material layer varies depending on the type of the conducting material, but the content of the conducting material usually ranges from 1 percent by mass to 10 percent by mass.

In addition, the positive electrode active material layer in the embodiment of the invention may further contain a binding agent. The binding agent may be, for example, a fluorine-containing binding agent, such as polyvinyliden fluoride (PVDF) and polytetrafluoroethylene (PTFE). In addition, the content of the binding agent in the positive electrode active material layer just needs to be an amount by which the positive electrode active material, and the like, may be immobilized, and is desirably smaller. The content of the binding agent usually ranges from 1 percent by mass to 10 percent by mass.

In the embodiment of the invention, the at least one of the positive electrode and the negative electrode is desirably the positive electrode, and the electrode active material layer is desirably the positive electrode active material layer. In this case, the positive electrode active material layer has a composition ratio such that a local volume ratio, which is expressed by the ratio ($V_a$(partial)/$V_e$(partial)) of the volume ($V_a$(partial)) of the positive electrode active material contained in a part of the positive electrode active material layer with respect to the volume ($V_e$(partial)) of the solid electrolyte material contained in the part of the positive electrode active material layer, increases as the part of the positive electrode active material layer approaches from the interface of the solid electrolyte layer toward the interface of the positive electrode current collector in the thickness direction of the positive electrode active material layer, and the voidage of the positive electrode active material layer increases as the part of the positive electrode active material layer approaches from the interface of the solid electrolyte layer toward the interface of the positive electrode current collector in the thickness direction of the positive electrode active material layer. The local volume ratio ($V_a$(partial)/$V_e$(partial)) is not specifically limited as long as it increases from the interface of the solid electrolyte layer toward the interface of the positive electrode current collector. A method of forming the positive electrode active material layer having a composition distribution such that the local volume ratio ($V_a$(partial)/$V_e$(partial)) intermittently increases from the interface of the solid electrolyte layer toward the interface of the current collector may be, for example, a method in which a plurality of positive electrode active material layers having different volume ratios of the positive electrode active material and the solid electrolyte material are formed by pressing and the obtained plurality of positive electrode active material layers are bonded to each other to be combined together, a method in which inks for forming positive electrode active material layers having different volume ratios of the positive electrode active material and the solid electrolyte material are overglazed, or a method in which inks for forming positive electrode active material layers having different volume ratios of the positive electrode active material and the solid electrolyte material are overlappingly formed by CVD, PVD, or the like. At this time, inks for forming positive electrode active material layers may be formed by mixing a solvent into slurry. A method of forming the positive electrode active material layer that has a composition distribution such that the local volume ratio ($V_a$(partial)/$V_e$(partial)) continuously increases from the interface of the solid electrolyte layer toward the interface of the current collector may be, for example, a method in which the positive electrode active material layer is formed by sputtering, ink-jet method, or the like, so that the volume ratio of the positive electrode active material and the solid electrolyte material has a continuous gradient, or a method in which a positive electrode mixture layer that uniformly mixes the positive electrode active material and the solid electrolyte material is applied onto the positive electrode current collector (for example, aluminum foil, or the like) and then magnetic force is exerted to form a composition having much positive electrode active material on the interface on which the positive electrode mixture layer is applied. After the positive electrode active material layer is formed, the positive electrode active material layer may be pressed in order to improve the electrode density.

In addition, the voidage of the positive electrode active material layer just needs to be increased from the interface of the solid electrolyte layer toward the interface of the current collector. For example, the voidage of the positive electrode active material layer desirably ranges from 0.05% to 40%, more desirably ranges from 0.1% to 20%. When the voidage of the positive electrode active material layer is too low, mechanical displacement due to expansion or contraction of the positive electrode active material is not sufficiently absorbed by voids and, therefore, warpage, deformation, crack, or the like, may occur in the positive electrode active material layer. When the voidage of the positive electrode active material layer is too high, the resistance of the positive electrode active material layer may increase. Note that the voidage of the positive electrode active material layer may be obtained by comparing the total volume of materials, calculated from the weights and densities of the materials contained in the positive electrode active material layer, with an actual volume of the positive electrode active material layer. In addition, the voidage of the positive electrode active material layer may be adjusted when the positive electrode active material layer is formed. Specifically, the voidage of the positive electrode active material layer may be adjusted by the pressing pressure and pressing temperature when the materials that constitute the positive electrode active material layer are pressed, the degree of dispersion of the materials that constitute the positive electrode active material layer, or the like.

The positive electrode active material layer in the embodiment of the invention may have a single layer structure formed of one layer or may have a multi-layer structure formed of two or more layers. When the positive electrode active material layer has a multi-layer structure, the resistance increases as the number of layers increases and, therefore, the all-solid battery may possibly not operate, so it is not desirable. In addition, the thickness of the positive electrode active material layer, for example, desirably ranges from 1 µm to 300 µm and more desirably ranges from 20 µm to 200 µm. This is because, when the thickness of the positive electrode active material layer is too small, a sufficient capacity cannot be obtained; whereas when the thickness of the positive electrode active material layer is too large, the resistance excessively increases and the output characteristic may decrease. Note that, when the positive electrode active material layer is formed of a plurality of layers, the thickness of the positive electrode active material layer is the total thickness of the positive electrode active material layers.

When the positive electrode active material layer according to the embodiment of the invention has a double-layer structure, for example, the positive electrode active material layer 12 formed of the first positive electrode active material layer 12a arranged closer to the positive electrode current collector 11 and the second positive electrode active material layer 12b arranged closer to the solid electrolyte layer 40 as shown in FIG. 1 may be used. In the first positive electrode active material layer adjacent to the positive electrode current collector, the volume of the contained positive electrode active material is desirably larger than the volume of the contained solid electrolyte material. From the above description of FIG. 2, the content of the positive electrode active material in the first positive electrode active material layer is desirably higher than or equal to 50 Vol %, more desirably higher than or equal to 55 Vol % and further desirably higher than or equal to 60 Vol %. This is because the percentage of coupled positive electrode active material particles in the first positive electrode active material layer may be significantly improved. In addition, the percentage of coupled positive electrode active material particles in the first positive electrode active material layer is desirably higher than or equal to 80% and more desirably higher than or equal to 90%. This is because a good electron conducting path may be formed. On the other hand, in the second positive electrode active material layer adjacent to the solid electrolyte layer, the volume of contained solid electrolyte material is desirably larger than the volume of contained positive electrode active material. Similarly, the content of the solid electrolyte material in the second positive electrode active material layer is desirably higher than or equal to 50 Vol %, more desirably higher than or equal to 55 Vol % and further desirably higher than or equal to 60 Vol %. This is because the percentage of coupled solid electrolyte material particles in the second positive electrode active material layer may be significantly improved. In addition, the percentage of coupled solid electrolyte material particles in the second positive electrode active material layer is desirably higher than or equal to 80% and more desirably higher than or equal to 90%.

This is because a good ion conducting path may be formed.

The positive electrode current collector in the embodiment of the invention has the function of collecting current from the positive electrode active material layer. The material of the positive electrode current collector may be, for example, SUS, aluminum, nickel, iron, titanium, carbon, or the like. Among others, the material of the positive electrode current collector is desirably SUS. In addition, the thickness, shape, and the like, of the positive electrode current collector are desirably selected appropriately on the basis of an application, or the like, of the all-solid battery.

Next, the negative electrode in the embodiment of the invention will be described. The negative electrode in the embodiment of the invention includes the negative electrode current collector and the negative electrode active material layer. The negative electrode active material layer is formed on the negative electrode current collector and contains the negative electrode active material and the solid electrolyte material.

The negative electrode active material layer in the embodiment of the invention at least contains the negative electrode active material and the solid electrolyte material, and may further contain at least one of a conducting material and a binding agent where necessary.

The negative electrode active material used in the embodiment of the invention may be, for example, a carbon material, such as mesocarbon microbead (MCMB), highly oriented graphite (HOPG), hard carbon and soft carbon, a lithium transition metal oxide, such as lithium titanate ($Li_4Ti_5O_{12}$), a metal alloy, such as $La_3Ni_2Sn_7$, or the like. In addition, the negative electrode active material may be powdery or may have a thin-film shape. Note that the solid electrolyte material, the conducting material and the binding agent used for the negative electrode active material layer are the same as those in the case of the above described positive electrode active material layer.

In the embodiment of the invention, the at least one of the positive electrode and the negative electrode may be the negative electrode, and the electrode active material layer may be the negative electrode active material layer. In this case, the negative electrode active material layer has a composition ratio such that a local volume ratio, which is expressed by the ratio ($V_a$(partial)/$V_e$(partial)) of the volume ($V_a$(partial)) of the negative electrode active material contained in a part of the negative electrode active material layer with respect to the volume ($V_e$(partial)) of the solid electrolyte material contained in the part of the negative electrode active material layer, increases as the part of the negative electrode active material layer approaches from the interface of the solid electrolyte layer toward the interface of the negative electrode current collector in the thickness direction of the negative electrode active material layer, and the voidage of the negative electrode active material layer increases as the part of the negative electrode active material layer approaches from the interface of the solid electrolyte layer toward the interface of the negative electrode current collector in the thickness direction of the negative electrode active material layer. The local volume ratio ($V_a$(partial)/$V_e$(partial)) is not specifically limited as long as it increases from the interface of the solid electrolyte layer toward the interface of the negative electrode current collector. Note that a method of forming the negative electrode active material layer that has a composition distribution such that the local volume ratio ($V_a$(partial)/$V_e$(partial)) increases from the interface of the solid electrolyte layer toward the interface of the negative electrode current collector and the voidage of the negative electrode active material layer are the same as those in the case of the above described positive electrode active material layer.

The negative electrode active material layer according to the embodiment of the invention may have a single layer structure formed of one layer or may have a multi-layer structure formed of two or more layers. When the negative electrode active material layer has a multi-layer structure, the resistance increases as the number of layers increases and, therefore, the all-solid battery may possibly not operate, so it is not desirable. In addition, the thickness of the negative electrode active material layer, for example, desirably ranges from 10 µm to 100 µm and more desirably ranges from 10 µm to 50 µm. Note that, when the negative electrode active material layer is formed of a plurality of layers, the thickness of the negative electrode active material layer is the total thickness of the negative electrode active material layers.

The negative electrode current collector in the embodiment of the invention has the function of collecting current from the negative electrode active material layer. The material of the negative electrode current collector may be, for example, SUS, copper, nickel, carbon, or the like. Among others, the material of the negative electrode current collector is desirably SUS. In addition, the thickness, shape, and the like, of the negative electrode current collector are desirably selected appropriately on the basis of an application, or the like, of the all-solid battery.

Next, the solid electrolyte layer in the embodiment of the invention will be described. The solid electrolyte layer in the embodiment of the invention is formed between the positive electrode and the negative electrode, and is formed of the solid electrolyte material. The solid electrolyte material contained in the solid electrolyte layer is not specifically limited as long as it has an electrical insulation property and an ion conduction property.

The content of the solid electrolyte material in the solid electrolyte layer is not specifically limited as long as it is the percentage that can give a desired electrical insulation property. For example, the content of the solid electrolyte material in the solid electrolyte layer, for example, desirably ranges from 10 percent by volume to 100 percent by volume and, among others, desirably ranges from 50 percent by volume to 100 percent by volume. Particularly, in the embodiment of the invention, the solid electrolyte layer is desirably formed of only the solid electrolyte material. This is because the all-solid battery may have an excellent output characteristic.

The solid electrolyte layer may contain the above described binding agent where necessary. The thickness of the solid electrolyte layer, for example, desirably ranges from 0.1 µm to 1000 µm and more desirably ranges from 0.1 µm to 300 µm. In addition, a method of forming the solid electrolyte layer may be, for example, a method of pressing the material that constitutes the solid electrolyte layer. In addition, the solid electrolyte layer may be formed in such a manner that the material that constitutes the solid electrolyte layer is mixed with a solvent into slurry and is applied.

The all-solid battery according to the embodiment of the invention at least includes the above described positive electrode, negative electrode and solid electrolyte layer. The all-solid battery usually further includes a battery case that accommodates these members. The battery case used in the embodiment of the invention may be a typical battery case for an all-solid battery. The battery case may be, for example, a SUS battery case, or the like.

The type of all-solid battery according to the embodiment of the invention may be an all-solid lithium battery, an all-solid sodium battery, an all-solid magnesium battery, an all-solid calcium battery, or the like. Among others, the type of all-solid battery is desirably an all-solid lithium battery or an all-solid sodium battery, and is further desirably an all-solid lithium battery. In addition, the all-solid battery according to the embodiment of the invention may be a primary battery or may be a secondary battery. Among others, the all-solid battery is desirably a secondary battery. This is because the secondary battery may be repeatedly charged or discharged, and is useful in, for example, an in-vehicle battery. The shape of the all-solid battery according to the embodiment of the invention may be, for example, a coin shape, a laminated shape, a cylindrical shape, a square shape, or the like.

In addition, the all-solid battery according to the embodiment of the invention may be an all-solid battery having a bipolar structure in which power generating elements, each of which is formed of the positive electrode active material layer, the solid electrolyte layer and the negative electrode active material layer, are laminated in series with one another via a current collector or may be an all-solid battery having a monopolar structure in which the power generating elements are laminated in parallel with one another via current collectors.

In the all-solid battery according to the embodiment of the invention, the discharge rate during usage is desirably lower than or equal to 8 C, more desirably lower than or equal to 6 C, further desirably lower than or equal to 4 C and particularly desirably lower than or equal to 2 C. This is because good performance may be exhibited in a usual charging and discharging environment in the vehicle. Note that the discharge rate during usage is usually higher than or equal to 0.1 C. In addition, a method of manufacturing the all-solid battery according to the embodiment of the invention is not specifically limited as long as the above described all-solid battery may be obtained. The method of manufacturing the all-solid battery may be a method similar to a typical method of manufacturing an all-solid battery. An example of the method of manufacturing the all-solid battery may be, for example, a method in which the positive electrode active material layer, the solid electrolyte layer and the negative electrode active material layer are respectively formed by the above described methods, a laminated body that is formed by sequentially laminating the positive electrode current collector, the positive electrode active material layer, the solid electrolyte layer, the negative electrode active material layer and the negative electrode current collector is pressed to manufacture a power generating element, the power generating element is accommodated inside a battery case and then the battery case is crimped.

Note that the aspect of the invention is not limited to the above embodiment. The above described embodiment is only illustrative. The scope of the invention encompasses any embodiment that includes substantially equivalent components and has substantially similar advantageous effects to those of the technical ideas recited in the appended claims.

Hereinafter, the aspect of the invention will be more specifically described with reference to examples.

First Example

First example is described bellow. The solid electrolyte material ($75Li_2S$-$25P_2S_5$) was pressed at 1 ton/cm$^2$ to form the solid electrolyte layer. Subsequently, the positive electrode mixture that mixes the positive electrode active material ($LiCoO_2$) and the solid electrolyte material ($75Li_2S$-$25P_2S_5$) at the volume ratio of 3:2 was pressed at 1 ton/cm$^2$ to form the first positive electrode active material layer. The voidage of the first positive electrode active material layer was 20%. In addition, the positive electrode mixture that mixes the positive electrode active material and the solid electrolyte material at the volume ratio of 3:5 was pressed at 1 ton/cm$^2$ to form the second positive electrode active material layer. The voidage of the second positive electrode active material layer was 17%. Subsequently, the first positive electrode active material layer and the second positive electrode active material layer were bonded to each other and pressed to be combined together to thereby form the positive electrode active material layer. Furthermore, the negative electrode mixture that mixes the negative electrode active material (C) and the solid electrolyte material ($75Li_2S$-$25P_2S_5$) at the volume ratio of 1:1 was pressed at 4.0 ton/cm$^2$ to form the negative electrode active material layer. Finally, the positive electrode active material layer, the solid electrolyte layer and the negative electrode active material layer were sequentially laminated to form the laminated body so that the first positive electrode active material layer is arranged adjacent to the current collector and the second positive electrode active material layer is arranged adjacent to the solid electrolyte layer, the laminated body was held by SUS foil current collectors, and a pressing machine was used to compress the laminated body to manufacture the all-solid battery.

First Comparative Example is described. Under the same condition as that of the first example except that the positive electrode mixture that mixes the positive electrode active material and the solid electrolyte material at the volume ratio of 1:1 was pressed at 1 ton/cm$^2$ to form the positive electrode active material layer, the all-solid battery was manufactured. Note that the voidage of the positive electrode active material layer was 18.5%. In addition, the thickness of the positive electrode active material layer used in the first comparative example was equal to the thickness of the positive electrode active material layer used in the first example.

Second Comparative Example is described. Under the same condition as that of the first example except that the positive electrode active material layer, the solid electrolyte layer and the negative electrode active material layer are sequentially laminated so that the first positive electrode active material layer is arranged adjacent to the solid electrolyte layer and the second positive electrode active material layer is arranged adjacent to the current collector, the all-solid battery was manufactured.

Figure 4:
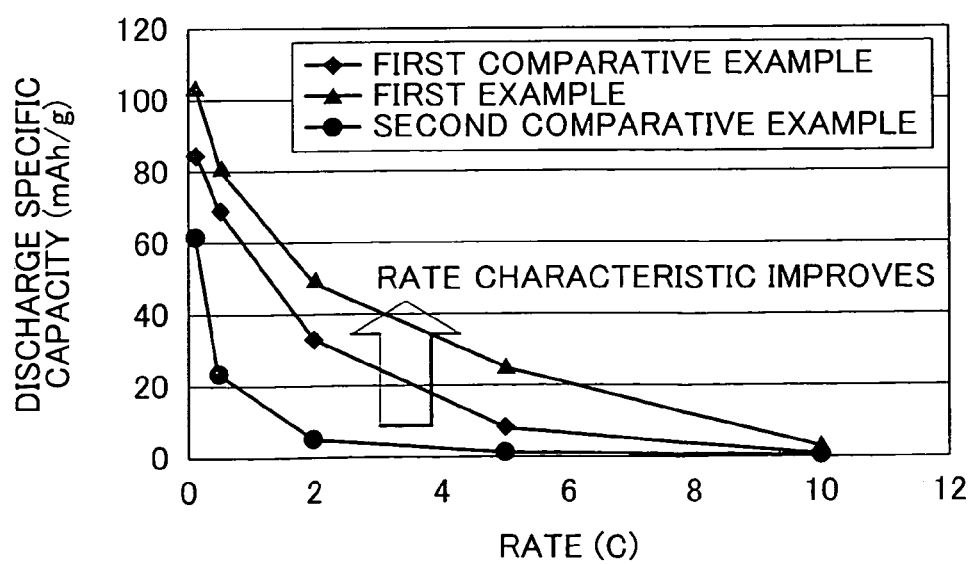
FIG. 4 is a graph that shows the evaluation results of the rate characteristics of all-solid batteries according to a first example, a first comparative example and a second comparative example.

The all-solid batteries obtained in the first example, the first comparative example and the second comparative example were used to evaluate the rate characteristics. First, the all-solid batteries were left standing at 25° C. for three hours. Subsequently, the all-solid batteries were charged to 4.1 V. After charging, the all-solid batteries were left standing at 25° C. for eight hours. Furthermore, the discharge test was conducted up to 3 V at a discharge current while changing the discharge current among 0.1 C, 0.5 C, 2 C, 5 C and 10 C to measure the discharge specific capacities. By so doing, the rate characteristics were evaluated. The results are shown in FIG. 4. As is apparent from FIG. 4, the all-solid battery obtained in the first example exhibits a higher discharge specific capacity than those of the all-solid batteries obtained in the first comparative example and the second comparative example, so it was confirmed that the rate characteristic is improved.

Figure 5:
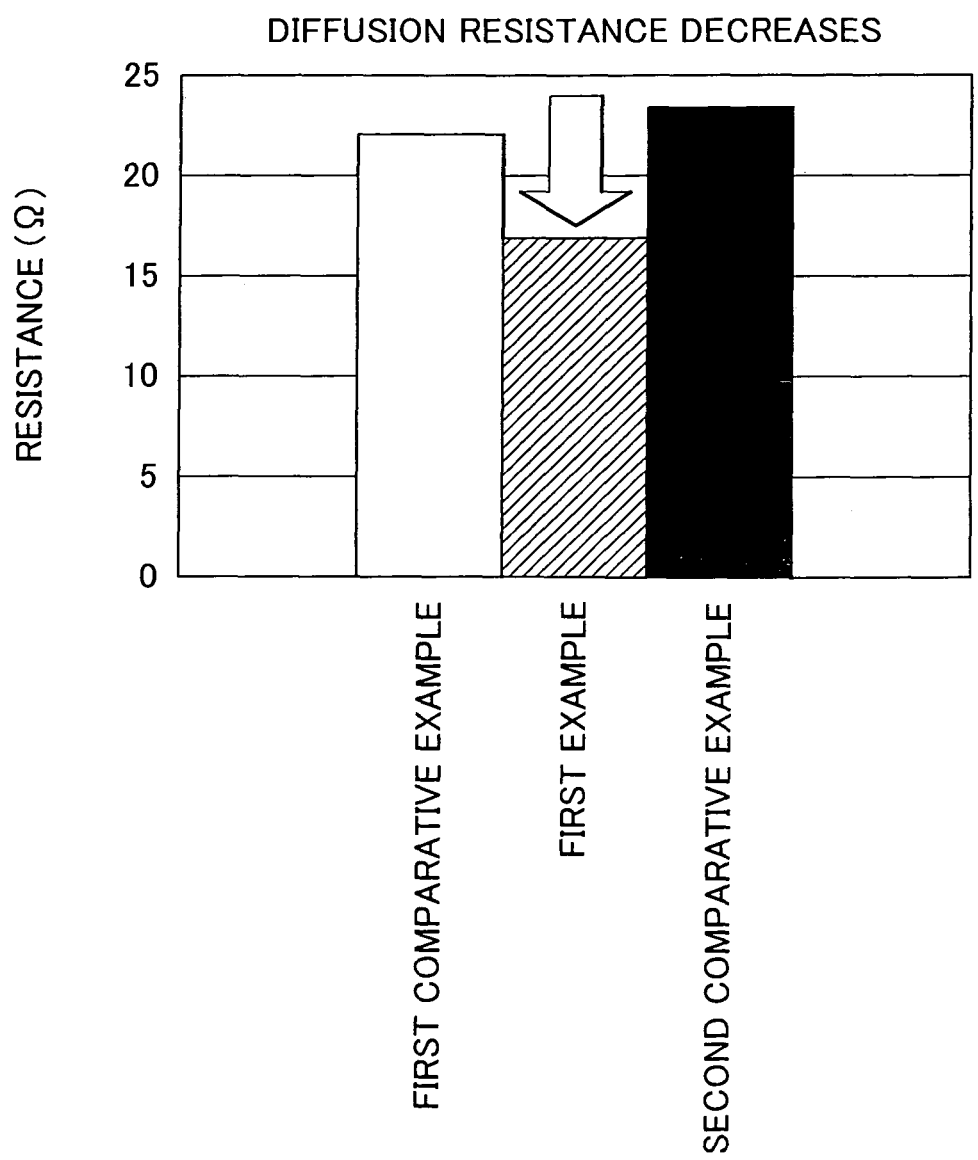
FIG. 5 is a graph that shows the measured results of diffusion resistances of the all-solid batteries according to the first example, the first comparative example and the second comparative example.

The all-solid batteries obtained in the first example, the first comparative example and the second comparative example were used to measure the diffusion resistances. After the potential of each of the all-solid batteries was adjusted to 3.7 V, the complex impedance was measured. By so doing, the diffusion resistance of each all-solid battery was calculated. The results are shown in FIG. 5. As is apparent from FIG. 5, it was confirmed that the all-solid battery obtained in the first example has a reduced diffusion resistance as compared with the all-solid batteries obtained in the first comparative example and the second comparative example.

What is claimed is:
1. An all-solid battery comprising:
a positive electrode that includes a positive electrode current collector and a positive electrode active material layer, wherein the positive electrode active material layer is formed on the positive electrode current collector and contains a positive electrode active material and a solid electrolyte material;
a negative electrode that includes a negative electrode current collector and a negative electrode active material layer, wherein the negative electrode active material layer is formed on the negative electrode current collector and contains a negative electrode active material and the solid electrolyte material; and a solid electrolyte layer that is formed between the positive electrode and the negative electrode; wherein
the electrode active material layer of at least one of the positive electrode and the negative electrode has a composition distribution such that a local volume ratio, which is expressed by a ratio of a volume of the electrode active material contained in a part of the electrode active material layer with respect to a volume of the solid electrolyte material contained in the part of the electrode active material layer, increases as the part of the electrode active material layer approaches from an interface of the solid electrolyte layer toward an interface of the current collector in a thickness direction of the electrode active material layer;
a voidage of the electrode active material layer increases as the part of the electrode active material layer approaches from the interface of the solid electrolyte layer toward the interface of the current collector in the thickness direction of the electrode active material layer;
the positive electrode active material is selected from the group consisting of a lithium transition metal oxide and a chalcogen compound; and
the negative electrode active material is selected from the group consisting of a carbon material, a lithium transition metal oxide and a metal alloy.

2. The all-solid battery according to claim 1, wherein
the electrode active material layer of the positive electrode has the composition distribution where the local volume ratio increases as the part of the electrode active material layer approaches from an interface of the solid electrolyte layer toward an interface of the current collector in a thickness direction of the electrode active material layer, and
the electrode active material layer is the positive electrode active material layer.

3. The all-solid battery according to claim 1, wherein the solid electrolyte material is any one of a sulfide-based solid electrolyte material and an oxide-based solid electrolyte material.

4. The all-solid battery according to claim 1, wherein the solid electrolyte material has a particulate shape.

5. The all-solid battery according to claim 1, wherein the increase in the local volume ratio includes a continuous increase and a stepwise increase.

6. The all-solid battery according to claim 1, wherein the increase in the voidage includes a continuous increase and a stepwise increase.

7. The all-solid battery according to claim 1, wherein the solid electrolyte layer contains the solid electrolyte material.

8. The all-solid battery according to claim 1, wherein the solid electrolyte layer is formed of only the solid electrolyte material.

9. The all-solid battery according to claim 1, wherein
the electrode active material layer is formed of a first electrode active material layer arranged closer to the current collector and a second electrode active material layer arranged closer to the solid electrolyte layer, and
a local volume ratio expressed by a volume ratio of the electrode active material in the first electrode active material layer is higher than a local volume ratio expressed by a volume ratio of the electrode active material in the second electrode active material layer, and a voidage in the first electrode active material layer is higher than a voidage in the second electrode active material layer.

10. The all-solid battery according to claim 9, wherein, in the first electrode active material layer, a volume of the contained electrode active material is larger than a volume of the contained solid electrolyte material.

11. The all-solid battery according to claim 9, wherein, in the second electrode active material layer, a volume of the contained solid electrolyte material is larger than a volume of the contained electrode active material.

12. The all-solid battery according to claim 1, wherein
the electrode active material layer further contains a conducting material, and
a volume of the conducting material contained in a part closer to the current collector is larger than a volume of the conducting material contained in a part closer to the solid electrolyte layer.

13. The all-solid battery according to claim 1, wherein the all-solid battery is a secondary battery.

14. The all-solid battery according to claim 1, wherein the positive electrode active material is selected from the group consisting of lithium cobaltate, $LiNiO_2$, lithium manganate, iron olivine, cobalt olivine, manganese olivine, lithium titanate, copper chevrel, iron sulfide, cobalt sulfide and nickel sulfide.

15. The all-solid battery according to claim 1, wherein the negative electrode active material is selected from the group consisting of a mesocarbon microbead, lithium titanate and $La_3Ni_2Sn_7$.

16. The all-solid battery according to claim 1, wherein
the positive electrode active material is selected from the group consisting of lithium cobaltate, $LiNiO_2$, lithium manganate, iron olivine, cobalt olivine, manganese olivine, lithium titanate, copper chevrel, iron sulfide, cobalt sulfide and nickel sulfide; and
the negative electrode active material is selected from the group consisting of a mesocarbon microbead, lithium, titanate and $La_3Ni_2Sn_7$.

17. The all-solid battery according to claim 16, wherein the negative electrode active material is selected from the group consisting of a mesocarbon microbead, lithium titanate and $La_3Ni_2Sn_7$.

* * * * *